L. Woodworth,
Hay Fork.
No. 78,169.                               Patented May 19, 1868.
Fig. 1.                    Fig. 2.
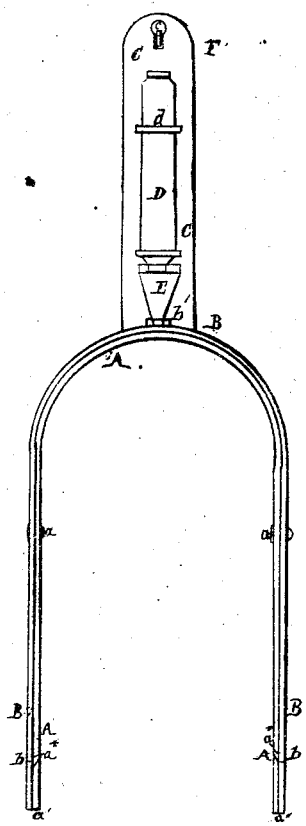
Witnesses
J. W. Coombs
A. Leclerc
L. Woodworth
per Brown Coombs
Atty

United States Patent Office.

LINUS WOODWORTH, OF TROY, PENNSYLVANIA.

Letters Patent No. 78,169, dated May 19, 1868.

IMPROVEMENT IN HORSE HAY-FORKS.

*The Schedule referred to in these Letters Patent and making part of the same.*

TO ALL WHOM IT MAY CONCERN:

Be it known that I, LINUS WOODWORTH, of Troy, in the county of Bradford, and State of Pennsylvania, have invented a new and useful Improvement in Hay-Elevators; and I do hereby declare that the following is a full, clear, and exact description of the same, reference being had to the accompanying drawings, making a portion of this specification, in which—

Figure 1 is a side view of a hay-elevator made according to my invention.

Figure 2 is a side view of the same, taken at right angles to fig. 1.

Similar letters of reference indicate corresponding parts in both figures.

This invention consists in two bows pivoted together, and having their extremities made pointed, and furnished with lateral spurs, so combined with a toggle-bar, slide-bar, and supporting-shank, that a very simple and efficient apparatus for pitching or elevating hay and like material by horse or other suitable power is secured.

To enable others to understand the construction and operation of my invention, I will proceed to describe it with reference to the drawings.

A and B indicate two bows, the general configuration of which is shown more fully in fig. 1, and which may be formed from flat metal bars. One of these bows is placed within the other, and the two are pivoted together by transverse pivots, $a$. The end portions of each of the bows are enlarged, and are made pointed, as shown at $a'$, each of the end portions being furthermore formed with a spur or shoulder, $b$, the shoulders upon one bow extending in a direction opposite to that of those upon the other. Secured to the upper or middle portion of the innermost bow is a plate or shank, C, which extends past the adjacent part of the other or outer bow, and is furnished with straps or guides, $d$, through which a slide-bar, D, has a longitudinal movement. The lower end of the slide-bar D has hinged or pivoted to it one end of a toggle-bar, E, the opposite end of which is pivoted in a similar manner to the edge of the outer bow, as shown at $b'$. Attached to the upper end of the slide-bar D is a tripping-cord, F, which passes through a hole, $e$, in the upper end of the shank C, and over a friction-pulley, $e'$, provided at the lower part of such hole.

The two bows being placed in a position parallel with each other, so that the sloping back $a^*$ of each end portion of one bow will be situated across the shoulder $b$ of the other, as indicated more fully in fig. 2, the pointed ends of the bows may be thrust down into the mass of the hay, or like material to be elevated or pitched, to any requisite depth, which being done, the slide-bar D is forced downward, and, acting through the toggle-bar E, forces apart the upper ends of the two bows, thus spreading apart the lower portions thereof, as represented in blue outline in fig. 2, so that the spurs or shoulders $b$, being thrust laterally outward, catch in and under the hay or material, to retain the same upon the apparatus while the latter is raised to the required extent by horse or other power, applied in the usual or any suitable manner to the draught-rope, attached to the upper end of the shank C, and shown in red outline in fig. 1. When the hay is thus elevated to the requisite height, the tripping-cord F is pulled, and, drawing upward the slide-bar D, brings the two bows to their original parallel position, thus withdrawing the spurs or shoulders from the hay or material, and discharging the same from the apparatus.

What I claim as my invention, and desire to secure by Letters Patent, is—

The two bows, pivoted together, and having their extremities pointed, and furnished with lateral spurs or shoulders, in combination with the toggle-bar, slide-bar, and shank, substantially as and for the purpose specified.

LINUS WOODWORTH.

Witnesses:
N. M. CARNOCHAN,
W. H. CARNOCHAN.